United States Patent
Eley

(10) Patent No.: US 6,306,248 B1
(45) Date of Patent: *Oct. 23, 2001

(54) METHOD FOR TRANSFORMING DIVERSE PULP AND PAPER PRODUCTS INTO A HOMOGENOUS CELLULOSIC FEEDSTOCK

(75) Inventor: Michael H. Eley, Huntsville, AL (US)

(73) Assignee: The University of Alabama in Huntsville, Huntsville, AL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,698

(22) Filed: Nov. 20, 1997

(51) Int. Cl.$^7$ .................................................. D21B 1/32
(52) U.S. Cl. ................... 162/4; 162/21; 162/55; 162/68; 95/230; 95/235
(58) Field of Search .................. 162/4, 21, 17, 162/55, 51, 15, 68; 209/903; 71/14, 11; 127/37; 95/230, 235

(56) References Cited

U.S. PATENT DOCUMENTS

| | | |
|---|---|---|
| 742,226 | 10/1903 | Peck et al. . |
| 1,617,014 | 2/1927 | Derleth . |
| 1,938,647 | 12/1933 | Earp et al. ............................... 71/10 |
| 2,317,992 | 5/1943 | Grether ..................................... 71/10 |
| 2,723,954 | 11/1955 | Young ...................................... 210/2 |
| 2,823,106 | 2/1958 | Pierson ..................................... 71/9 |
| 2,969,277 | 1/1961 | Carlsson et al. .................... 23/259.1 |
| 3,055,744 | 9/1962 | Petersen ............................... 23/259.1 |
| 3,057,769 | 10/1962 | Sandberg ................................ 162/4 |
| 3,235,369 | 2/1966 | Eweson ..................................... 71/9 |
| 3,236,604 | 2/1966 | Pierson ............................... 23/259.1 |
| 3,272,740 | 9/1966 | Gitchel et al. .......................... 210/63 |
| 3,359,200 | 12/1967 | Gitchel et al. .......................... 210/63 |
| 3,365,395 | 1/1968 | McDonald ............................. 210/21 |
| 3,451,800 | 6/1969 | Hudson et al. ........................ 71/12 |
| 3,549,010 | 12/1970 | Marsh et al. ........................... 210/71 |
| 3,572,010 | * 3/1971 | Dupps ..................................... 95/235 |
| 3,587,851 | 6/1971 | Anderson ............................... 209/74 |
| 3,741,863 | 6/1973 | Brooks .................................... 162/4 |
| 3,849,246 | 11/1974 | Raymond et al. ....................... 162/4 |
| 3,867,509 | * 2/1975 | Geiger et al. .......................... 162/51 |
| 3,883,329 | * 5/1975 | Dupps ..................................... 95/235 |
| 3,932,166 | 1/1976 | Vignovich et al. ..................... 71/11 |
| 4,010,098 | 3/1977 | Fassell ..................................... 210/10 |
| 4,033,907 | 7/1977 | Wolf ...................................... 260/2.3 |
| 4,056,380 | 11/1977 | Thiac ....................................... 71/9 |
| 4,079,837 | 3/1978 | Grube et al. ........................... 209/12 |
| 4,106,627 | 8/1978 | Watanabe et al. ...................... 209/7 |
| 4,157,961 | 6/1979 | Borst ...................................... 210/33 |
| 4,185,680 | 1/1980 | Lawson ................................... 162/5 |
| 4,235,707 | 11/1980 | Burke, Jr. ................................ 209/3 |
| 4,264,352 | 4/1981 | Houser ..................................... 71/9 |
| 4,274,911 | * 6/1981 | Kroneld et al. ........................ 162/15 |
| 4,297,322 | 10/1981 | Liu . |
| 4,312,701 | 1/1982 | Campbell ................................ 162/4 |
| 4,321,150 | 3/1982 | McMullen ............................. 210/769 |
| 4,342,830 | 8/1982 | Holloway .............................. 435/161 |
| 4,461,648 | 7/1984 | Foody ..................................... 127/37 |
| 4,483,704 | 11/1984 | Easter, II ................................... 71/9 |
| 4,511,091 | 4/1985 | Vasco ..................................... 241/18 |
| 4,540,467 | 9/1985 | Grube et al. ............................ 162/4 |
| 4,540,495 | 9/1985 | Holloway .............................. 210/774 |
| 4,570,861 | 2/1986 | Zentgraf et al. ....................... 241/24 |
| 4,607,797 | 8/1986 | Enikolopow et al. ................. 241/23 |
| 4,632,729 | 12/1986 | Laakso ................................... 162/17 |
| 4,769,149 | 9/1988 | Nobilet et al. ....................... 210/603 |
| 4,842,877 | 6/1989 | Tyson . |
| 4,844,351 | 7/1989 | Holloway .............................. 241/19 |
| 4,872,953 | 10/1989 | Smith .................................... 162/261 |
| 4,971,616 | 11/1990 | Glogowski ............................... 71/9 |
| 4,974,781 | 12/1990 | Placzek ................................. 241/17 |
| 4,983,296 | 1/1991 | McMahon et al. .................. 210/603 |
| 4,999,084 | 3/1991 | Lang et al. .............................. 162/4 |
| 5,023,097 | 6/1991 | Tyson . |
| 5,119,994 | 6/1992 | Placzek ................................. 241/17 |
| 5,122,228 | 6/1992 | Bouchette et al. ..................... 162/4 |
| 5,137,599 | 8/1992 | Maxham ................................. 162/5 |
| 5,164,042 | 11/1992 | Larsen et al. ......................... 162/25 |
| 5,176,793 | 1/1993 | Kurtz ...................................... 162/4 |
| 5,190,226 | 3/1993 | Holloway . |
| 5,198,075 | 3/1993 | Nivelleau de La Bruniere et al. ........... 162/19 |
| 5,253,764 | 10/1993 | Gement . |
| 5,262,003 | 11/1993 | Chupka et al. ......................... 162/4 |
| 5,361,994 | 11/1994 | Holloway . |
| 5,391,261 | 2/1995 | Van Den Bergh ...................... 162/4 |
| 5,427,650 | 6/1995 | Holloway ............................... 162/5 |
| 5,445,329 | 8/1995 | Anderson . |
| 5,470,433 | 11/1995 | Brodersen et al. ................... 162/77 |
| 5,492,407 | 2/1996 | Gement . |
| 5,540,391 | 7/1996 | Anderson . |
| 5,556,445 | 9/1996 | Quinn et al. ............................ 71/11 |
| 5,624,616 | 4/1997 | Brooks .................................. 264/83 |
| 5,705,216 | 1/1998 | Tyson . |

FOREIGN PATENT DOCUMENTS

| | | |
|---|---|---|
| 2520598 | 11/1975 | (DE) . |
| 407370A | 1/1991 | (EP) . |
| 278406 | 3/1971 | (RU) . |

\* cited by examiner

Primary Examiner—Peter Chin
(74) Attorney, Agent, or Firm—Thompson Hine LLP

(57) ABSTRACT

A method for treating diverse pulp and paper products to produce a homogenous cellulosic feedstock comprises the steps of feeding diverse pulp and paper products into a vessel, introducing steam into the vessel while agitating the products, purging the gases from the vessel while agitating the products, sealing the vessel so that the vessel is pressure tight, saturating the products with steam at sufficient temperature and pressure to expand molecular structure of the products, while agitating the products, depressurizing the vessel to further enhance the molecular expansion of the products, and discharging the processed products. Alternatively, the method can be performed without purging the gases, if the temperature in the range of about 287° F. to about 312° F., and the pressure is in the range of about 40 to 65 psig. During the optional purging step, during the depressurization step, and during the optional evacuation step, volatile organic compounds and other air pollutants can be captured and treated.

73 Claims, 3 Drawing Sheets

METHOD FOR TRANSFORMING DIVERSE PULP AND PAPER PRODUCTS INTO A HOMOGENOUS CELLULOSIC FEEDSTOCK

BACKGROUND OF THE INVENTION

The present invention relates to recycling and more particularly to the recycling of diverse pulp and paper products to provide a homogenous cellulosic feedstock having a plurality of beneficial uses.

Fossil materials are finite natural resources, and these materials are rapidly being consumed. The world is also facing many environmentally significant problems associated with the depletion of fossil materials, particularly petroleum, for the production of energy and petrochemicals. A variety of solid, liquid, and volatile organic compounds associated with petroleum extraction, transport, refining, and manufacturing operations have been and are continuing to be released into the environment. However, the most significant environmental factor is the release of carbon dioxide into the atmosphere during the burning of fossil fuels.

The use of fossil fuels has added tremendous quantities of carbon dioxide to the atmosphere. Since this carbon dioxide is being released from fossilized biomass long since effectively removed from the biosphere, there is currently insufficient plant life on earth to consume all of the carbon dioxide being produced. Therefore, the percentage of carbon dioxide in the atmosphere is increasing. Carbon dioxide and other "greenhouse gases" (e.g., volatile organic compounds) allow high energy, short wave length solar radiation to penetrate the atmosphere and to transfer heat to the earth's surface, but the same gases impede the low energy, long wave length radiation that dissipates the absorbed heat from the earth. Thus, heat from the sun is trapped in the earth's atmosphere, which is known as the "Greenhouse Effect." Reduction or elimination of the use of fossilized carbonaceous materials as combustion fuels would halt and possibly reverse current trends in altering the biosphere. The use of renewable biomass as a replacement for fossilized combustion fuels is a formidable task, but it is an environmentally beneficial task that is well worth the effort, especially when considering the long term effects of continuing current trends.

Another environmental concern facing today's earth is the production and disposal of waste, including municipal solid waste (MSW). The ability to recycle such waste productively and efficiently could significantly reduce the current volume of unused and discarded waste.

Municipal solid waste (MSW) includes, but is not limited to, cellulosic and/or noncellulosic materials such as office wastes, business wastes, institutional wastes, industrial wastes, residential wastes, pulp and paper products, inks, glues, plastics, glass, metals, food wastes, and yard wastes. Within MSW, the cellulosic component (e.g., pulp and paper components) accounts for a relatively large portion of MSW. Therefore, there has been a particular need to try to recycle and utilize the pulp and paper components to reduce the amount of MSW.

Many attempts have been made to use MSW for energy production in so-called resource recovery facilities. Some such facilities incinerate the MSW without any prior separation of potentially recyclable materials, with the possible exception of curb side or drop-off source recycling, to produce steam and/or electricity. These facilities are known as mass-burn incinerators, which are very expensive to site, permit, construct, and operate, in addition to producing large quantities of hazardous or toxic gases and airborne particulates, as well as large quantities of hazardous or toxic fly ash and sometimes bottom ash that must be landfilled. Some other such facilities use MSW that has been shredded with some non-combustibles subsequently removed prior to incineration for energy recovery, which are known as refuse derived fuel (RDF) incinerators. RDF incinerators tend to emit lesser amounts of hazardous or toxic air pollutants and to produce lesser amounts of hazardous or toxic ash than mass-burn facilities. Still other facilities use a combination of manual labor and mechanical devices to separate recyclable materials from the MSW, which are known as MSW materials recovery facilities (dirty MRFs). The non-recyclables from dirty MRFs are usually shredded and incinerated either on-site or off-site for energy recovery. The incinerator fuel from dirty MRFs produce lesser amounts of air pollutants and ash than either mass-burn or RDF incineration facilities. Some attempts have also been made to cap and recover the gases from MSW landfills for energy production. Landfill gas recovery and use does reduce the emission of greenhouse gases that would otherwise be emitted to the atmosphere, particularly volatile organic compounds from household and industrial chemicals in MSW and methane and carbon dioxide from anaerobic digestion of the putresible materials in MSW. Carbon dioxide from the incineration of chemically unaltered biomass (e.g., wood, yard wastes, and food wastes) and even chemically altered biomass (e.g., pulp and paper products, leather, rubber, and some other polymers of plants) does not result in a net increase in the concentration of carbon dioxide in the atmosphere, unlike fossilized biomass. The recent biomass, as opposed to fossil biomass, is renewable, since growing plants fix sufficient carbon dioxide into new biomass to essentially recycle the atmospheric carbon dioxide produced by their eventual decay or combustion. As pointed out earlier, combustion of fossilized biomass (e.g., petroleum, coal, etc.) does cause a net increase in atmospheric carbon dioxide.

The use of renewable plant biomass, including such materials as waste pulp and paper products in MSW, for producing solid, liquid, and gaseous fuels, chemicals, fertilizers, and other useful products, in addition to energy via direct combustion, would reduce or eliminate dependence on fossil materials and the unwanted secondary effects of the use of fossil materials as noted above, and, at the same time, would reduce unused and discarded waste.

In order to be able to fully utilize plant biomass to replace fossilized carbonaceous materials, it is necessary to transform the plant biomass, particularly woody biomass, into a form that is easily accessible to various chemicals, enzymes and/or microbes to convert the biomass into the desired end products. Natural biodegradation is an excellent means to break down plant biomass to its basic substituents, but the process is too slow to meet the demand for raw materials in industrialized societies. Therefore, if plant biomass is to be effectively used, it must be rapidly degraded.

Woody biomass is a hard substance that provides few points of entry for chemicals, enzymes and microbes to gain access to the composite molecules. The pulp and paper industry has already devised ways to at least partially break down the structure of woody biomass through mechanical size reduction and chemical treatments, but since the desired end products of this industry must retain a fibrous consistency with tensile strength and rigidity, additional treatments are necessary to transform these pulp and paper products into a homogenous cellulosic feedstock suitable for the final molecular breakdown into other useful products, such as fuels, chemicals and fertilizers.

The fibrous materials of pulp and paper products have been obtained from wood. Wood, like other plant materials, is a product of a biological process known as photosynthesis, in which plants consume simple inorganic minerals, carbon dioxide and water using sunlight as an energy source, and metabolically manufacture all of the different types of organic molecules consistent with living organisms. Photosynthetic organisms, mostly green plants, are at the top of the food chain, and they also yield oxygen as a by-product of the photosynthetic process. Such plants are not only a source of food and fiber for all other living organisms, but they also consume a greenhouse gas, carbon dioxide, and emit oxygen, which is required by all living organisms, including photosynthetic plants for metabolic "combustion" of carbonaceous molecules called respiration.

Respiration is a metabolic process whereby organic molecules serve as food from which living organisms extract the solar energy entrapped in the chemical bonds of the molecules for life processes while consuming oxygen for the oxidation or combustion of the food and emitting carbon dioxide and water as by-products. The principal and most abundant type of organic material of plant biomass is the structural component called lignocellulose. This material is composed mostly of three distinct biopolymers: cellulose, hemicellulose and lignin. These biopolymers are an abundant source of renewable energy and carbonaceous material that can and will eventually replace fossilized materials for the production of fuels, chemicals, fertilizers, and energy.

Prior attempts have been made and a few processes have been developed to separate pulp and paper products from commingled mixtures of waste and to break down the pulp and paper products to its substituents for varied uses. Previous methods have relied on physical shearing of such materials to simply reduce the particle size. There are a variety of these so-called "dry" methods that subject these materials either to high-speed hammer mills or low-speed grinders to produce a fairly uniform particle size ("fluff"). This fluff is usually prepared from waste, such as MSW, and after separation of dense materials, such as glass, grit, ferrous metals, and high moisture contaminants that have also been reduced in particle size during the shredding process, the dry fluff is used as "refuse derived fuel" for direct combustion to produce energy.

Another so-called "wet" method utilizes a device called a hydropulper, which is the equivalent of a large kitchen blender, to shred such materials suspended in a large volume of water. This is a popular method used by the pulp and paper industry to reduce the particle size of such materials so that it may be recycled into the manufacture of new pulp and paper products.

These methods do yield pulp and paper products of a fairly uniform size, but none of these methods is intended to, nor do they, alter the basic molecular structure of the cellulosic fibers of the pulp and paper materials to facilitate the intercalation of chemicals, enzymes, or microbes into the structure to bring about a more efficient and complete breakdown of the polymeric molecules comprising the fibrous materials.

A brief summary of the prior art attempts and other processes that involve processing of wastes and other materials follows.

U.S. Pat. No. 5,427,650 to Holloway discloses an apparatus and method for separation, recovery, and recycling municipal solid waste and the like by introducing solid waste materials into a rotatable pressure vessel, rotating, pressurizing, adding pH controlling chemicals and heating the pressure vessel and thus the waste material while simultaneously applying a mixing action to the solid waste material. Further, a vacuum is applied to the vessel to control the moisture content of the final fine organic portion of the process material.

U.S. Pat. No. 4,844,351 to Holloway discloses a method for treatment of mixed waste containing various plastics, such as municipal solid wastes, in which mechanical agitation and heat distortion of plastic films cause rupture and spilling of the contents of plastic film containers in the waste. The operating temperature of the process is in the range of about 195° F. to 215° F.

U.S. Pat. No. 4,540,495 to Holloway discloses a process for treating municipal solid waste material in the presence of moisture for the separation and recovery of inorganic matter and organic matter wherein the waste material is fed into a pressured chamber and is agitated therein. The contents of the pressure chamber are subjected to heat under a pressure for a predetermined period of time to cook, sterilize and soften the organic matter contained therein. The moisture content of the waste material is controlled so that the fines of the organic fractions have a residual moisture content ranging from about 60% to 70%.

U.S. Pat. No. 4,342,830 to Holloway discloses a process for recovery of organics and inorganics from waste material with a specific object of preparing the separated organic fraction for the production of ethanol wherein rigid organic matter becomes soft when subjected to heat and pressure. The process is carried out by feeding the waste material into a perforated container mounted within a closed chamber. The container is then agitated by suitable means, such as by rotation, as the chamber is subjected to pressure and heat to sterilize the waste material and soften the organic matter contained therein. The chamber is then depressurized wherein the softened organic matter is forced out of the container through its perforation, leaving only inorganic matter therein. The softened organic matter is shredded and broken up as it is forced through the perforations of the container.

U.S. Pat. No. 5,119,994 to Placzek discloses an apparatus and method for processing medical waste materials comprising an elongate pressure vessel having an inlet end, and a closely fitting inlet closure member. Moisture and heat are utilized to aid the processing of the waste.

U.S. Pat. No. 4,974,781 to Placzek discloses a method and apparatus to affect the separation of component fractions from paper-containing and plastic-containing waste materials. The method utilizes a rotating vessel equipped with lifting paddles and directional flighting. Moisture and heat are added in the process to effect repulping of paper materials.

U.S. Pat. No. 5,556,445 to Quinn et al. discloses a method for treating solid municipal waste material including placing solid municipal waste in a rotating chamber having an interior at ambient pressure, heating the waste at ambient pressure, and controlling the moisture content of the waste.

Russian Pat. No. 278406 discloses a process for treating wood chips within an agitating container at a temperature of 100° C. with saturated steam at 110 C. in the complete absence of air and at a relative humidity of 40%.

European Pat. No. 0 407 370 A2 to Richter discloses a method and apparatus providing for the continuous digestion of comminuted cellulosic fibrous material (e.g. wood chips) to produce paper pulp, with increased sulfidity.

U.S. Pat. No. 5,198,075 to Nivelleau de La Bruniere et al. discloses a method of digesting lignocellulose materials impregnated with solutions of hydroxides or salts of alkali or alkaline earth metals.

U.S. Pat. No. 4,632,729 to Laakso discloses a method and apparatus for effecting presteaming and deaeration of wood chips, or like, comminuted cellulosic fibrous material. The method utilizes a vertical presteaming vessel and a second vessel for deaeration.

U.S. Pat. No. 5,164,042 to Larsen et al. discloses a method of producing high-yield pulp from pulp chip material containing lignocellulose. The pulp chipped material is treated with steam in a steam treating station for driving air out of the material and heating the material. The heat treated material is then mixed in a mixing station with a liquid containing chemicals.

U.S. Pat. No. 5,470,433 to Brodersen et al. discloses a process for the delignification of cellulose fiber plant raw material for the production of pulp using separate impregnating and delignifying stages, each using alcohol and alkali.

U.S. Pat. No. 5,624,616 to Brooks discloses a method for making lignocellulose fibers, which may be optionally coated with a suitable thermoplastic, wherein the starting materials may be chosen from a wide variety of generally non-recyclable contaminated wood, paper, and/or plastic products. A mixture of the preferred lignocellulose material characterized by a relatively low moisture content and the desired thermoplastics is refined and comminuted in a steam atmosphere which is at a temperature, pressure, and duration sufficient to soften both the lignin within the wood chips and the thermoplastic polymer. The temperature of the steam atmosphere is relatively high, at least about 170° C., because of the use of dry wood chips which do not result in excessive vaporization during heating. The method also uses a steam pressure of at least 100 psig.

U.S. Pat. No. 5,176,793 to Kurtz discloses a method for treating wood-fiber pulp, particularly pulp which contains recycled paper. The pulp is dewatered and then heated by means of super heated steam under pressure prior to being passed to a disburser in which the pulp is finely divided. The pulp is then passed from the disburser to a plug-outfeed screw.

U.S. Pat. No. 4,999,084 to Lang et al. discloses a method for removing wax particles from short fiber fractions, which have been separated from long fibers.

U.S. Pat. No. 5,137,599 to Maxham discloses a process for the production of paper making fiber or a pulp from waste solids emanating from pulp and paper mills, particularly waste solids and processed water streams.

U.S. Pat. No. 5,391,261 to Van Den Bergh discloses a method of bleaching de-inked pulped and removing the ink polar particles with steam.

U.S. Pat. No. 5,262,003 to Chupka et al. discloses a process of preparing a suspension of paper making fibers in water for use in the making of paper.

U.S. Pat. No. 4,872,953 to Smith discloses an apparatus and method for improving the quality of paper manufactured from recycled paper stock with comprises a hydrokinetic amplifier, a pulper, a dump chest, a cyclone separator, a pressure screen, a vibratory screen and a holding tank.

U.S. Pat. No. 5,122,228 to Bouchette et al. discloses a method of treatment of waste paper or the like at high temperatures in the range of 160° C. to about 230° C. The furnish is treated in a digester with or without added chemicals but in the presence of saturated steam. The preferred dwell times are in the range of about 1 minute to about 6 minutes. The treated furnish is then discharged from the digester, preferably, but not exclusively by an explosive discharge.

U.S. Pat. No. 4,312,701 to Campbell discloses a method for defibrating waste paper and disbursing contained asphalt and wax contaminates within the fibers. The waste paper is initially pulped with water and the resulting stock is then contacted with a high pressure stream of steam having a velocity in the range of 1200 to 1600 ft/sec. The mixture of steam and stock is passed through a mixing tube under highly turbulent conditions to defibrate the waste paper and disburse any asphalt, waxes, and other contaminates throughout the separated fibers. The resulting stock can be used in paper making processes, particularly for the production of paper board products.

U.S. Pat. No. 3,057,769 to Sandberg discloses a process of making paper of uniformed appearance free from normally visible spots from waste paper stock carrying bituminous material. The process uses a paper beater for disintegrating the stock, and makes a slurry of 0.7 to 1% of fiber in water.

U.S. Pat. No. 4,297,322 to Liu discloses equipment and method for treating solid waste in which a non-oxidizing atmosphere is provided through which the shredded solid wastes falls freely, unsupported and non-contacted, to prevent fusion of the plastics with each other, with other materials in the solid waste, or with the walls or components in the treating equipment. The process operates at temperatures of about 600 to 900° F.

U.S. Pat. No. 4,325,707 to Burke, Jr. discloses a method and apparatus for treating solid municipal waste or other material within a pressure vessel which is pressurized with steam or a compressed gas. The pressure vessel is referred to as a "cannon" because the pressure vessel has a hinged mussel closure which can be opened rapidly by the pressure inside the vessel so that the solid material passes through the opening created.

U.S. Pat. No. 3,741,863 to Brooks discloses a method of providing cellulosic fibers and fiber bundles from sources of waste material, such as municipal and industrial waste products, for making medium density fiber board and/or paper. The process is a dry process utilizing the cellulosic products present in municipal and household waste. The waste is pulverized into small pieces, where after it is dried to remove excess moisture, and also for sterilization. After separating the cellulosic material from the other constituents of the waste, the cellulosic material is heated in the presence of a non-flammable medium, such as steam, to raise the temperature thereof and to affect further sterilization.

U.S. Pat. No. 4,540,467 to Grube et al. discloses a method and apparatus for the removal of mold core material from metal castings and for fragmentation of municipal waste material, e.g., paper products, involving heating and hydrating the materials within a pressure vessel. Chemicals active on the material to be processed or the hydration water are added during hydration to soften the material to be removed or fragmented. Excess liquid in the vessel is drained and pressurized steam is added for a selected period of time. A suitable temperature and pressure are achieved such that the moisture or liquid carried by the processed material will rapidly turn to steam or vapor when the pressure in the vessel is rapidly reduced by quickly opening and unloading means at the bottom of the pressure vessel. The sudden release of pressure (explosive) in the vessel causes the moisture to change to steam and a certain portion of the liquid in the material to flash to vapor in accordance with thermodynamic laws. The resulting rapid expansion within the processed material fragments it.

U.S. Pat. No. 4,079,837 to Grube et al. discloses a method for the separation of components of solid wastes which has been treated by thermal explosive decomposition followed by biodegradation (also referred to as composting). The explosive decomposition and composting pretreatment before separation presents a granular and inoffensive finely-divided product mixed with less fragmented nonbiodegradable materials such as plastic, metals and other substances. The method first separates the finely-divided product from the waste to leave a first residue, then magnetically separates any magnetic components from the first residue to leave a second residue, and then separates by gravity floatation any plastic components from the second residue, each step being carried out successfully without any interruption for further treatment of the waste.

U.S. Pat. No. 4,461,648 to Foody discloses a method for increasing the accessibility of cellulose in lignocellulosic materials to chemical or biochemical reagents. The method has extremely high operating pressures, 250 to 1000 psig, and has a purging step while the materials are under pressure.

Accordingly, it has been one objective of this invention to provide improved processes for transforming diverse pulp and paper products into a homogeneous cellulosic feedstock.

Another objective of the invention has been to provide processes for the volume reduction of municipal solid waste (MSW). A further objective of the invention has been to provide processes for reducing the volume of MSW while producing components during that process for use as replacements for fossil material.

Still another objective of the invention has been to provide an improved process for transforming diverse pulp and paper products into a homogeneous cellulosic feedstock useful for conversion into fuels, chemicals, fertilizers, and other useful products.

SUMMARY OF THE INVENTION

The present invention is a method for treating diverse pulp and paper products, from waste paper and MSW, to produce a homogenous cellulosic feedstock that can be used as a direct combustion fuel, or converted into other solid, liquid, or gaseous fuels, chemicals, fertilizers and other useful products. More specifically, the homogenous cellulosic feedstock derived from the present invention is thus concerned not only with depletion rates of the finite source of fossil materials and reduction of the generation of excess carbon dioxide released from burning or consumption of such fossil materials, but also with the reduction in the volume of unused and discarded MSW. Various aspects of the present invention as will be appreciated, are realized in the improved processing of diverse pulp and paper products, for use as feedstocks for energy sources, and as feedstocks for chemical, enzymatic and microbial conversions into fuels, chemicals, fertilizers, and energy.

Diverse pulp and paper products in relation to the present invention means any and all known products produced by the pulp and paper industry through the mechanical and chemical treatment of woody biomass and plant fibers to convert such biomass materials into reformulated products. Examples of such pulp and paper products include, but are not limited to, Kraft paper, sulfite paper, bond paper, ledger paper, computer paper, printers mixed paper, special file stock, pressed board, box board, card board, corrugated card board, and packaging materials and components.

The most abundant and cheapest sources of pulp and paper products are waste paper and MSW, with MSW often containing 50% or more pulp and paper products. While this invention is primarily designed for using waste paper, it is also capable of utilizing MSW as a source of pulp and paper products for transformation into a homogeneous cellulosic feedstock for the chemical, enzymatic and microbial conversions into fuels, chemicals, fertilizers, and/or energy.

The present invention thus contemplates a method of transforming diverse pulp and paper products into a homogenous cellulosic material that is an ideal feedstock for chemical, biological and/or thermal conversion to yield a variety of fuels, chemicals, fertilizers, and/or energy.

Pulp and paper products are abundant, cheap, and renewable materials made from woody biomass that has already undergone extensive mechanical and chemical degradation of the lignocellulose, but the invention contemplates further transformation into feedstocks that are soft and loose with tremendous surface area for access by chemicals, enzymes, and microbes to be able to achieve a rapid and effective conversion to chemical substituents. The major chemical components of cellulose and hemicellulose, particularly the sugars glucose, mannose and xylose can be further converted into useful fuels and chemicals by biological fermentations. The other chemical components, mainly from lignin, can be converted into a variety of hydrocarbon products by chemical and thermochemical decomposition.

One transformation process, according to one embodiment of the present invention, includes the following steps:
(a) feeding diverse pulp and paper products into a vessel;
(b) introducing steam into the vessel while agitating the products;
(c) purging gases from the vessel while agitating the products;
(d) sealing the vessel so that the vessel is pressure tight;
(e) saturating the products with steam at sufficient temperature and pressure to expand molecular structure of the products;
(g) depressurizing the vessel to further enhance the molecular expansion of the products; and
(h) discharging the processed products therefrom.

The process of the present invention is environmentally conscious, in that it allows any volatile organic compounds (VOCs), air polluting compounds, and any other undesirable gases associated with the pulp and paper products or MSW to be purged from the vessel in a controlled manner, captured and collected. Furthermore, this process physically and chemically breaks down the pulp and paper products into the desired end product, namely a homogenous cellulosic feedstock that can be used as a direct combustion fuel and/or converted into other fuels, chemicals, fertilizers, and other useful products.

Accordingly, one object of the present invention is to improve the management and collection of VOCs, air pollutants and any other undesirable gases that would usually be emitted from MSW buried in landfills and particularly such substances that would be emitted during the transformation process.

An alternative transformation process according to the present invention, comprises the following steps:
(a) feeding diverse pulp and paper products into a vessel;
(b) sealing the vessel so that the vessel is pressure tight;
(c) injecting steam into the vessel while agitating the products;
(d) saturating the products with steam at a temperature in the range of about 287° F. to about 312° F. and at a pressure in the range of about 40 psig to about 65 psig to expand the molecular structure of the products;
(e) depressurizing the vessel to further enhance the molecular expansion of the products; and
(f) discharging the processed products therefrom.

Like the previous process, this process may further include the step of purging gases from the vessel for the same reasons as cited above.

In either process, it is desirable to capture any remaining VOCs or other pollutants during the depressurizing step. Such VOCs and other pollutants can then be treated prior to release to the atmosphere. In fact, the collection of VOCs and other pollutants from the vessel can be separated into condensables and noncondensables which would be likely treated differently. For example, condensers can be used to condense some of the purged gases prior to cooking the products, and condense the decompression steam, which may contain some VOCs and/or other pollutants that are volatilized at temperatures above 212° F. The capture of condensable and noncondensable components during the depressurizing step aids in cooling and drying the processed products.

If starting with MSW, preferably the discharging step includes the step of screening discharged products, then separating larger sized products and returning larger sized products to a second similar transformation process. It is also desirable to separate any remaining non-cellulosic components from the products by any suitable process such as by screening, air classification, etc.

In yet another alternative process, a plurality of vented vessels are interconnected, each capable of treating its pulp and paper products as noted above. The discharging steam upon opening one vented vessel is channeled to an adjacent vented vessel for purging that vessel and so on down the chain of vessels. The discharged material is conveyed from each vessel to a common separation of non-cellulosic components (when MSW is used) and with the separated larger sized cellulosic component recycled through the system a second time for further treatment.

Accordingly, the present invention provides a process of transforming diverse pulp and paper products into a homogenous cellulosic feedstock which provides a substitute direct combustion fuel that can reduce the dependency upon fossil fuel materials and correspondingly reduces carbon dioxide production from the combustion of fossil fuel materials; provides a means of reducing the quantity of unused and discarded wastes; and provides a means to capture volatile organic compounds and other environmentally damaging gases from wastes.

DETAILED DESCRIPTION

Figure 1:
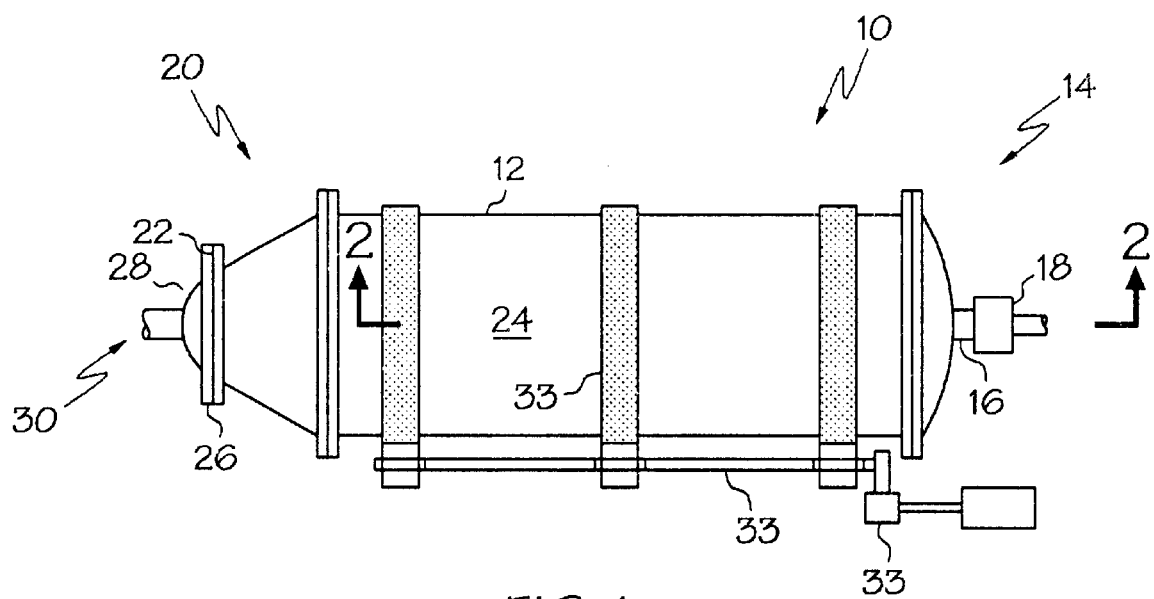
FIG. 1 is a schematic view of a vented vessel used in accordance with the present invention.

The method for treating diverse pulp and paper products for producing a homogenous cellulosic feedstock can be used generally with any known suitable vessels. However, by way of example, the discussion regarding the method of the present invention will be related to the vented vessel as shown in FIG. 1. As shown in FIG. 1, the vented vessel, generally designated 10, includes a cylindrical housing 12 with a closed end 14, except for a centrally disposed penetration port 16, which is connected to a rotary union 18 for steam injection and/or depressurization. The opposite end 20 of the vessel 10 includes a doorway 22 for introduction of the waste materials to be processed in the vessel interior 24, and for discharge of the processed materials. The doorway opening 22 may be the same diameter as the cylindrical housing 12. Alternatively, the cylindrical housing 12 may be tapered to a smaller diameter 26 for large diameter vessels for economical and mechanical reasons related to the door closure and weight thereof. The door 28 is preferably completely detachable from the vessel 10 to allow free rotation of the vessel 10 about its horizontal axis in either a clockwise or a counter clockwise direction, either with the door 28 attached and closed as generally shown in FIG. 1 or with the door 28 open and detached (not shown). The door 28 includes a second penetration port 30 which is also connected to a rotary union (not shown, but similar to 18) for the addition of a vent valve (not shown). The vessel 10 includes an over-pressure relief valve (not shown).

Figure 2:
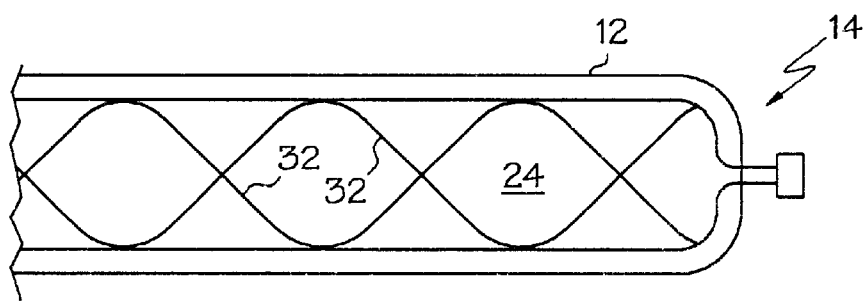
FIG. 2 is a partial, cross-sectional view of FIG. 1 taken along line 2—2.

As shown in FIG. 2, the vessel interior 24 is preferably equipped with two or more helical flights 32 that traverse the entire length of the vessel 10, including the closed end 14 and the tapered end 20, if present. The number of flights is determined on the basis of the vessel diameter, and the flights would be positioned equidistant from each other around the circumference of the vessel interior 24, for example, two flights would be 180° apart, four flights would be arranged such that a single flight is 90° apart from an adjacent flight. The flights are attached to the interior walls of the cylindrical housing 12, the closed end 14, and the tapered end 26 (if present) and would radiate toward the horizontal axis. The optimum height of the flights from the wall toward the horizontal axis and the frequency of the spiral along the length is determined empirically. Depending on the length of the cylindrical housing 12, at least two equally disposed sparging lines (not shown) may be attached to the interior wall of the cylindrical housing 12 or alternatively, attached to the exterior wall of the cylindrical housing 12 with penetrations into the interior of the cylindrical housing 12 through which steam may be injected into the interior of the housing 12. The sparging lines could be parallel to the horizontal axis or alternatively combined with the helical flighting. Holes or other penetrations would exist in the sparging lines to provide high velocity steam injection when the pressure differential is great.

The vessel 10 is mounted in a frame, generally designated 33, that allows rotation of the vessel in either a clockwise or counterclockwise direction about its horizontal axis H. The frame is capable of being pivoted to allow the door end 20 of the vessel 10 to be raised such that the vessel 10 may be tilted at a predetermined angle above horizontal for loading waste materials to be processed or lowered such that the vessel may be tilted to a predetermined angle below horizontal for discharging the processed materials, while simultaneously rotating the vessel in either rotational direction. The means of tilting the vessel 10 while allowing rotation is known in the art. The maximum and optimum tilt angles above and below horizontal would be determined empirically. Alternatively, the vessel 10 mounted in its frame may be positioned either horizontally or at a fixed angle of repose with respect to its horizontal axis, such that the closed end 14 is lower than the door end 20. The optimum fixed angle would be determined empirically.

The vessel 10 further includes a means of support to allow rotation in either rotational direction to prevent flexing of the vessel 10 along its horizontal axis. The vessel 10 would also include means of support to allow the unit to be tilted above or below horizontal, or alternatively, to allow the unit to be mounted horizontally or at a fixed angle from horizontal as recited above while simultaneously allowing rotation in either direction. The vessel 10 further includes a means of rotation in either direction which shall be continuously variable in rotational speed from about 0 to about 10 rpm, with the optimum rotation speed during processing being about 5 rpm.

The door 28 of the vessel 10 should allow the vessel 10 to be rotated in either rotational direction either with the door 28 open or closed. Preferably, the door closure member 28 should be completely detachable from the vessel housing 12.

The closed end 14 of the vessel 10 includes a centrally disposed penetration port 16 connected externally with a rotary union 18 that allows the vessel 10 to be rotated in either rotational direction while being connected to a stationary conduit for delivery of steam or for venting the vessel 10. The stationary conduit may be of flexible high pressure construction to allow the vessel 10 to be tilted while connected to the stationary conduit. The penetration port 16 on the closed end 14 may be connected internally with the sparging lines to provide a means for steam to be injected via high velocity openings into the vessel interior 24.

The doorway 22 is of the same diameter as the cylinder housing 12 or a smaller diameter for large diameter vessels in which the door end 20 of the cylinder housing 12 is conically tapered. A smaller doorway may be more economical and lighter in weight to facilitate removal of the closure member. The doorway 22 is centrally disposed and is not less than 3 feet in diameter. The closure member is preferably completely detachable from the vessel 10 to allow rotation in either direction with the closure member closed or removed. A penetration port is centrally disposed in the closure member for the connection of a vent valve generally designated 30. A rotary union (not shown) may also be connected to the penetration port to allow the vessel 10 to rotate in either direction while connected to a stationary conduit for collection of vapors released via the vent valve 30.

Figure 3:
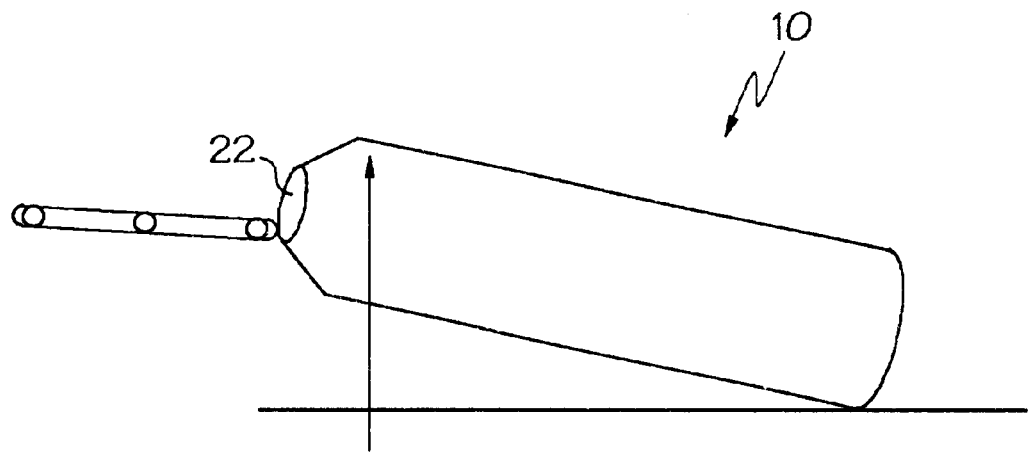
FIG. 3 is a schematic view of the vented vessel oriented in a filling position.

In operation, the vessel door 28 is opened or preferably removed, and the vessel 10 may remain in a horizontal repose or preferably may be either fixed or tilted to a predetermined angle above horizontal with the doorway opening 22 in the raised end position as best shown in FIG. 3. A suitable means, such as a belt conveyor, is inserted into the doorway 22. The vessel 10 is rotated in the direction that the helical flighting 32 provides a means of conveyance of materials away from the doorway 22 and toward the closed end 14 of the vessel 10.

A predetermined amount of water may be introduced into the vessel 10, if deemed necessary, either prior to or concurrently with the introduction of the material to be processed. The amount of water added is dependent upon the moisture content of the material to be processed. A predetermined weight of the solid materials to be processed are then introduced into the vessel 10 while simultaneously rotating the vessel 10 in the above described direction. As the materials are introduced, a compaction and uniform wetting of the solid materials takes place. The moisture content of the solid materials should be at least 20% by weight, preferably in the range of 20%–60% by weight. Addition of solids is continued until the predetermined weight of material has been introduced into the vessel 10. The volume of the vessel interior 24 filled or occupied by the waste will vary with the density of the material. The door closure member 28 is then replaced and sealed.

The vent 30 on the door 28 is opened and connected to an appropriate means to collect the vapors and condensate to be emitted. The vessel 10 may remain in a horizontal repose or preferably either the tilt angle of the vessel 10 is adjusted to or is fixed at a predetermined angle above horizontal for processing and the rotation of the vessel is reversed to convey materials up and away from the closed end 14 and toward the door end of the vessel 10.

Steam is introduced via the penetration port 16 in the closed end 14 and into the vessel interior 24 via the high velocity openings in the sparging lines, if present. As the steam is introduced into the vessel interior 24, the steam simultaneously transfers heat and moisture to the vessel 10 contents (waste) and saturated steam purges and/or displaces the air, vapors and other gases within the vessel 10 and its contents. This preheating and purging step is continued until the purged gases escaping the vent 30 on the door reach a temperature above 212° F., and the vent 30 is then closed. The vessel 10 is continuously rotated and steam injection is continued until the vessel 10 reaches a sufficient temperature and pressure to expand molecular structuring of the products. During the initial introduction of steam while the vent 30 is open and before significant internal steam pressure is reached, the saturated steam enters at a high velocity due to the pressure differential. This high velocity steam along with the vessel rotation exposes the contents to shearing forces and the steam also melts and tears any film plastic containers thus spilling their contents. The high velocity steam also forces both moisture and heat into the diverse pulp and paper materials and other biomass or water absorptive materials which also causes an expansion of the matrix of the pulp and paper materials making them more fragile for size reduction due to the mixing action taking place in the vessel.

The desired mixing action within the vessel is for the helical flighting to convey the materials near the vessel wall up and away from the closed end 14 of the vessel 10 but as the vessel 10 rotates, the material is also rolled and spilled over the edge of the flighting and falls due to gravity through an atmosphere of saturated steam, thus exposing the materials to mixing as well as both heat and moisture. The preferred angle of the helical flighting and the inclined angle of the vessel is determined empirically.

In the purging and heating process, absorbed moisture within the materials to be transformed and from condensate of the injected steam both displace entrapped gases and act as a heat transfer conduit. After the purge vent is closed and steam injection continues, the temperature of the water in the material increases above the boiling point of water (212° F. or 100° C.) and the water thus makes the transition from liquid to vapor, which is effective to permit the heated water to expand into a gas, which is about 22 times the volume of an equivalent weight of water, within the materials, opening up the materials and greatly expanding the molecular structure, thereby, producing a cellulosic feedstock material of great surface area, which is open to chemical, enzyme and microbe treatments, for producing fuels, chemicals, fertilizers, and other useful products, and additionally open to air for faster and more complete combustion. The biomass materials are not simply separated from any oversized product and non-biomass, but rather are transformed into a homogenous cellulosic feedstock more treatable than materials provided in other processes.

The vessel 10 and its contents are heated and pressurized to a maximum of about 65 psig or a minimum of about 45 psig of saturated steam, more preferably about 55 psig. Once the operating pressure is reached, the material is continuously mixed by rotating the vessel while simultaneously maintaining the pressure for at least 30 minutes up to a maximum of 1 hour. Preferably, the vessel 10 is rotated at a rotational speed in the range of about 0 to 10 rpm, more preferably 5 rpm.

Alternatively, with a properly insulated vessel, the steam injection may be continued until the maximum pressure of about 65 psig is reached, and then the steam injection may be discontinued but the mixing would be continued for the desired time period. This period of continuous mixing with or without continuous steam injection is to provide a period of time for the contents to reach equilibrium or uniformity of composition—a state when the contents are uniformly mixed and transformed into the desired product with the combination of moisture and heat. After the desired equilibrium period, the vessel is depressurized via the vent 30 on the door while simultaneously and continuously mixing the contents to achieve as much heat and vapor loss as possible. As the steam atmosphere in the vessel is expelled, at least a portion of both the free moisture on the surfaces and the absorbed moisture in the contents within the vessel 10 are also vaporized which both cools and partially dries the materials. The vaporization of the absorbed moisture in the cellular and capillary areas of the cellulosic materials causes a rapid expansion of these structures due to the 22-fold increase in volume causing an expansion and exfoliation of the structures which further enhances the transformation of the materials into the homogenous cellulosic product.

Figure 4:
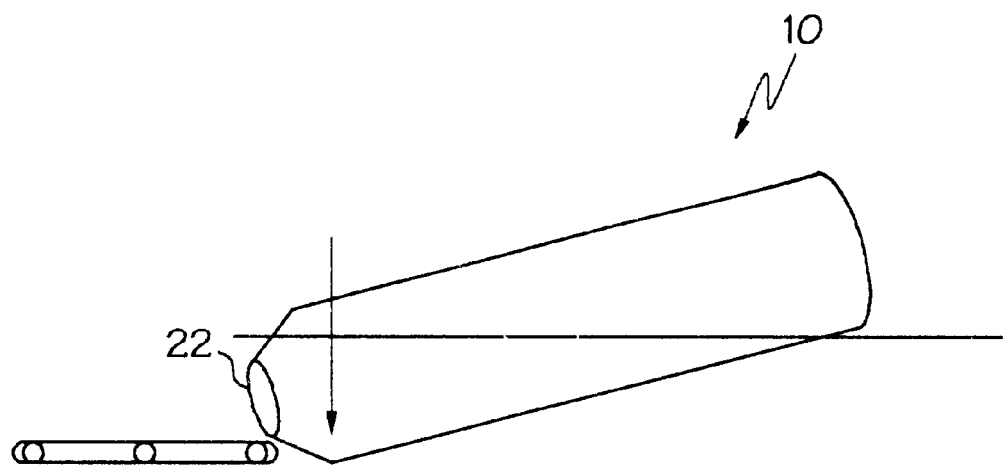
FIG. 4 is a schematic view of the vented vessel oriented in a discharging position.

After depressurization to atmospheric pressure, the processed materials remain hot and moist at about 212° F. Optionally, the vessel 10 would then be evacuated while continuously mixing to both further cool and dry the materials by using the latent heat and evaporating the moisture in the materials. Once the materials are cooled and dried to the extent desired the vessel 10 is returned to atmospheric pressure. The vessel 10 is briefly rotated in the initial or forward direction to convey the processed materials away from the door 28. The door closure member 28 is opened or preferably detached from the vessel. The door end 20 of the vessel 10 preferably is lowered to tilt the vessel 10 to a predetermined angle below horizontal (FIG. 4), and the vessel 10 is rotated in the reverse direction to convey the processed materials toward the open doorway 22. The contents are thus discharged from the vessel 10. If there is no mechanism of lowering the vessel 10 below horizontal, or if the vessel 10 is mounted at a fixed angle of incline above horizontal, the contents will also be discharged from the vessel 10 by the helical flighting 32 when rotated in reverse direction but the unloading process usually takes considerably longer.

Figure 5:
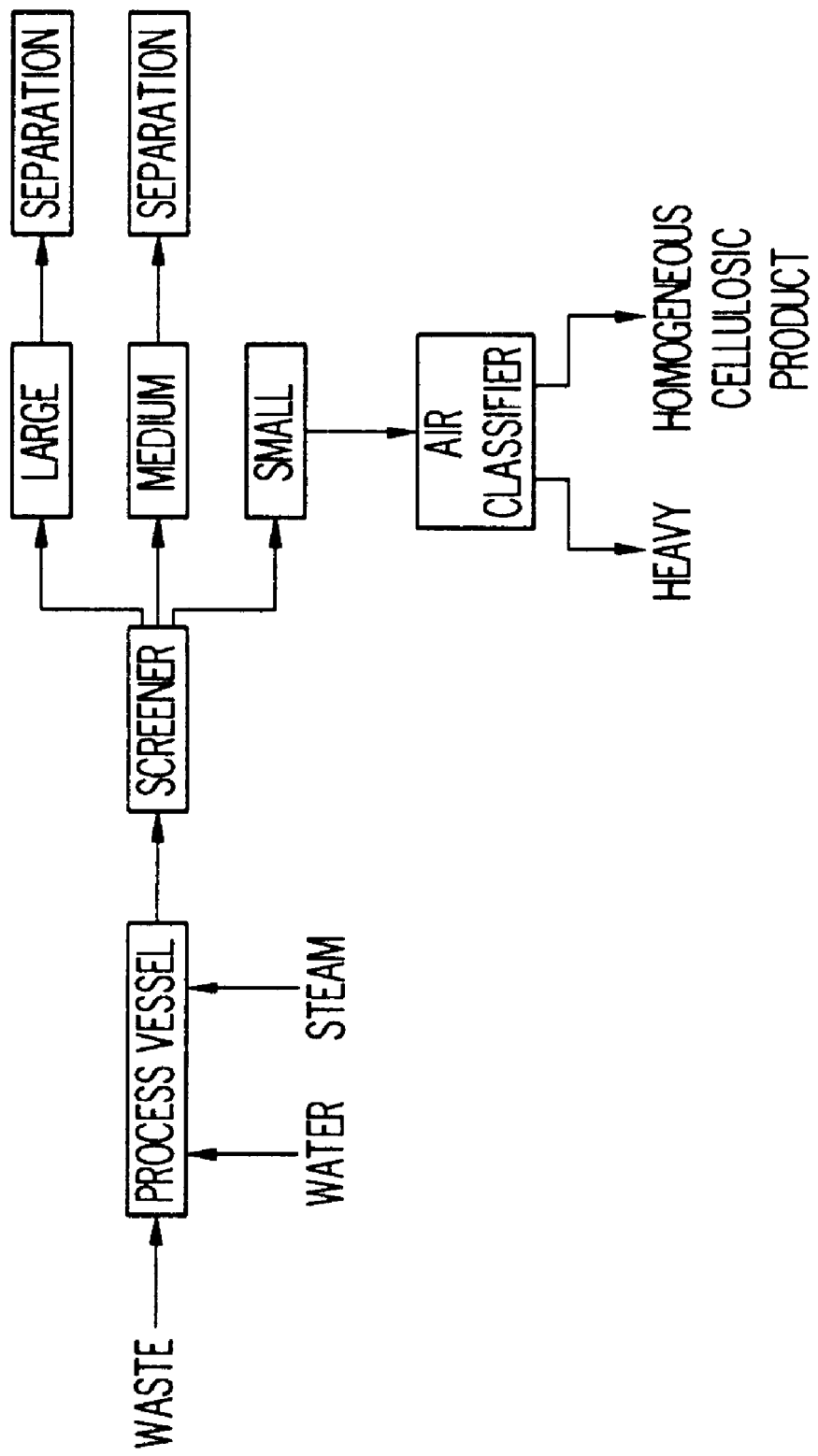
FIG. 5 is a flow chart in accordance with one embodiment of the present invention.

As generally represented schematically in FIG. 5 for example, the processed materials are preferably discharged onto a means of conveyance, such as a belt conveyor, for transport typically to a screening device, such as a vibratory or rotary trommel screener for separation based on size. The particle size of the cellulosic product may be determined empirically based on the desired end use of the cellulosic biomass. Very few cellulosic materials, other than woody biomass or lumber contaminants, are found in the process materials that are larger than 5 centimeters particle size. Typically, about 80% of the cellulosic biomass will be obtained in the less than 2.5 centimeters screen fraction. Preferably the screening process would take place with a heated air stream blowing over the materials to achieve further drying. This would be particularly effective in an enclosed rotary trommel with a hot air stream blowing through it. Any contaminating materials from a mixed waste stream larger than 5 centimeters would typically include ferrous metals, nonferrous metals, polyethylene terephthalate (PET) plastic containers, polypropylene (PP) plastic films and molded products, textiles, rubber, leather, and wood, and these materials may be sorted manually and/or mechanically for recycling. If an intermediate screen fraction of less than 5 centimeters, but greater than 1.3 centimeters is obtained, this fraction would include a small percentage of a mixture of the same materials as the greater than 5 centimeter fraction, but the 1.3–5 centimeter fraction would consist mostly of broken glass, amorphous aggregate of melted plastics, and incompletely transformed cellulosic materials, including pulp and paper materials. These materials may also be sorted into recycled products. If the desired cellulosic product is to be less than 1.3 centimeters, the 1.3–5 centimeter pulp and paper materials would be separated and recovered by various means such as an air knife, for reprocessing either by including in a subsequent batch of unprocessed materials or by combining with similar fractions from several batch processes to be reprocessed together as a batch.

The smallest particle size fraction from the screening step which would typically be less than 5 centimeters from a mixed waste stream would typically be contaminated with significant quantities of broken glass, ceramics, and amorphous aggregates of melted plastics and minor amounts of ferrous and nonferrous metals. Most of these contaminants may be removed by various means, such as a stoner or air classification using a hot air stream to dry and suspend the homogenous cellulosic product in the air stream. The heavy fraction from this step could also be sorted into recycled products or due to their small volume and composition discarded in an inert landfill. The smallest particle sized screened biomass fraction that has been further processed to remove the contamination of nonbiomass materials is the homogenous cellulosic product.

An alternative transformation process utilizes a similar vented vessel as shown in FIG. 1, but does not absolutely require the step of purging gases from the vessel and its contents prior to processing. However, such a step can be optionally used in the process. The steps of the alternative process are substantially identical to the process recited above, except that the alternative process occurs at a specific temperature and pressure range. Volatile organic compounds (VOCs) and other potential pollutants that would optionally be captured during an earlier purge step are in this alternative transformation process captured for treatment during the depressurization step to atmospheric pressure.

Preferably the residual moisture content of the processed cellulosic materials is significantly less than 65% by weight, and more preferably is less than 50% by weight. High moisture content has adverse effects on many possible processing steps subsequent to discharge from the vessel. As an example, moisture contents of the cellulosic product higher than 65% are more or less "self-adhesive" and tend to form into compact, dense spheres which are difficult to dry and air classify, rather than retaining loose, "fluffy" texture, which is a preferred objective of this process. Additionally, the smaller particles tend to adhere to other cellulosic particles making the particle size larger than desired for screening and also the cellulosics to adhere to non-cellulosic contaminants making such materials less desirable for recycling. The principal purpose of moisture in the process is to insure uniform heat transfer and distribution throughout the biomass materials which facilitates the desired transformation. However, after the equilibration step, several steps may be included in the process to remove as much moisture as possible from the processed material, including depressurization with continuous agitation, evacuation, screening in a hot air stream, air classifying with hot air, etc. The evaporation of retained moisture after processing also enhances the transformation of the cellulosics into a fluff with extensive surface area while simultaneously cooling the products. Furthermore, a cool, dry product (less than 10% moisture by weight) may be stored for extended periods of time without odor or significant biodegradation as a result of molding or composting.

Having described the invention in detail and by reference to the drawings, it will be apparent that modifications and variations are possible without departing from the scope of the invention as defined in the following claims.

What is claimed is:

1. A method for treating diverse pulp and paper products derived from waste paper or MSW to produce a homogenous cellulosic feedstock, comprising the steps of:
    feeding diverse pulp and paper products into a vessel;
    introducing steam into the vessel while agitating the products;
    purging gases from the vessel through a vent valve while agitating the products;
    capturing said gases and treating the gases to render any volatile organic compounds and any other air pollutants present in the gases harmless;
    sealing the vessel so that the vessel is pressure tight;
    saturating the products with steam at sufficient temperature and pressure to expand molecular structure of the products, while agitating the products;
    depressurizing the vessel to further enhance the molecular expansion of the products; and
    discharging the processed products therefrom.

2. The method of claim 1 wherein the pulp and paper products are derived from municipal solid waste.

3. The method of claim 1 wherein the method further includes the step of classifying cellulosic components of the processed products from other components.

4. The method of claim 3 wherein the step of classifying includes the step of separating the cellulosic components based on particle size.

5. The method of claim 4 wherein the step of classifying includes the step of separating the cellulosic components based on density.

6. The method of claim 5 wherein the step of classifying includes the step of separating the cellulosic components based on both particle size and density.

7. The method of claim 1 wherein the method further includes the steps of separating larger size components of the processed products and recycling the larger size components through the vessel for more processing.

8. The method of claim 1 wherein the method further includes the step of introducing the steam from the depressurized vessel into a second vessel containing diverse pulp and paper products for purging gases from the second vessel prior to full treatment of the products within the second vessel.

9. The method of claim 8 wherein the method further includes the steps of discharging processed products from each of a plurality of the vessels into a common conveyed stream, separating larger components from smaller components in the stream, and recycling the larger components through at least one of the vessels.

10. The method of claim 1 wherein the saturating step occurs at a temperature in the range of about 287° F. to about 312° F.

11. The method of claim 1 wherein the saturating step occurs at a pressure in the range of about 40 psig to about 65 psig.

12. The method of claim 1 wherein the pulp and paper products have a moisture content of about 20% to about 60% by weight prior to the step of introducing steam.

13. The method of claim 1 wherein the temperature and pressure are maintained for a time sufficient for the products to be uniformly mixed and transformed into the homogenous cellulosic feedstock.

14. The method of claim 13 wherein the time is in the range of about 30 to about 60 minutes.

15. The method of claim 1 wherein the vessel includes a common opening serving as an inlet and outlet and the steps of feeding the diverse pulp and paper products into the vessel and discharging the diverse pulp and paper products from the vessel are both accomplished through the common opening.

16. The method of claim 15 wherein the vessel includes two or more internally mounted helical flights, the rotation of which agitates the pulp and paper products.

17. The method of claim 16 wherein the rotation of the helical flights in one direction causes the products to move away from the common opening.

18. The method of claim 17 wherein the rotation of the helical flights in a second direction causes the products to move toward the common opening.

19. The method of claim 15 wherein the vessel is capable of being tilted such that the common opening is positioned to not permit the products to fall out of the vessel.

20. The method of claim 15 wherein the vessel is capable of being tilted such that the common opening is positioned to permit the processed products to fall out of the vessel.

21. The method of claim 1 wherein the step of depressurizing the vessel includes the step of recovering any steam remaining in the vessel.

22. The method of claim 1 wherein the step of recovering steam further includes the steps of condensing the steam and treating any condensable pollutants to render them harmless.

23. The method of claim 1 wherein the step of recovering the steam includes the step of recycling the steam.

24. The method of claim 1 wherein the step of depressurizing the vessel includes the steps of cooling and drying the processed products, and capturing any volatile organic compounds or any other air pollutants remaining in the vessel.

25. The method of claim 24 wherein the step of capturing volatile organic compounds and other air pollutants further includes the step of treating the volatile organic compounds and other air pollutants to render the volatile organic compounds and other air pollutants harmless.

26. The method of claim 24 wherein the step of cooling and drying further includes an evacuation step.

27. The method of claim 1 wherein said processed products are transported for use as a fuel or fertilizer.

28. A method for treating diverse pulp and paper products derived from waste paper or MSW to produce a homogenous cellulosic feedstock comprising the steps of:
    feeding diverse pulp and paper products into a vessel;
    sealing the vessel so that the vessel is pressure tight;
    injecting steam into the vessel while agitating the products;
    saturating the products with steam at a temperature in the range of about 287° F. to about 312° F. and at a pressure in the range of about 40 psig to about 65 psig to expand the molecular structure of the products;
    depressurizing the vessel to further enhance the molecular expansion of the products;
    capturing any gases released during said depressurizing and treating said gases to render any volatile organic compounds and any air pollutants presents in the gases harmless; and discharging the processed products therefrom.

29. The method of claim 28 wherein the pulp and paper products are derived from municipal solid waste.

30. The method of claim 28 wherein the method further includes the step of classifying cellulosic components of the processed products from other components.

31. The method of claim 30 wherein the step of classifying includes the step of separating the cellulosic components based on particle size.

32. The method of claim 31 wherein the step of classifying includes the step of separating the cellulosic components based on density.

33. The method of claim 30 wherein the step of classifying includes the step of separating the cellulosic components based on both particle size and density.

34. The method of claim 28 wherein the method further includes the steps of separating larger size components of the processed products and recycling the larger size components through the vessel for more processing.

35. The method of claim 28 wherein the method further includes the step of introducing the steam from the depressurized vessel into a second vessel containing diverse pulp and paper products for purging gases from the second vessel prior to full treatment of the products within the second vessel.

36. The method of claim 35 wherein the method further includes the steps of discharging processed products from each of a plurality of the vessels into a common conveyed stream, separating larger components from smaller components in the strewn, and recycling the larger components through at least one of the vessels.

37. The method of claim 28 wherein the pulp and paper products have a moisture content of about 20% to about 60% by weight prior to the step of introducing steam.

38. The method of claim 28 wherein the temperature and pressure are maintained for a time sufficient for the products to be uniformly mixed and transformed into the homogenous cellulosic feedstock.

39. The method of claim 38 wherein the time is in the range of about 30 to about 60 minutes.

40. The method of claim 28 wherein the vessel includes a common opening serving as an inlet and outlet and the steps of feeding the diverse pulp and paper products into the vessel and discharging the diverse pulp and paper products from the vessel are both accomplished through the common opening.

41. The method of claim 40 wherein the vessel includes two or more internally mounted helical flights, the rotation of which agitates the pulp and paper products.

42. The method of claim 41 wherein the rotation of the helical flights in one direction causes the products to move away from the common opening.

43. The method of claim 41 wherein the rotation of the helical flights in a second direction causes the products to move toward the common opening.

44. The method of claim 41 wherein the vessel is capable of being tilted such that the common opening is positioned to not permit the products to fall out of the vessel.

45. The method of claim 41 wherein the vessel is capable of being tilted such that the common opening is positioned to permit the processed products to fall out of the vessel.

46. The method of claim 28 wherein the step of depressurizing the vessel includes the steps of cooling and drying the processed products, and capturing any volatile organic compounds or any other air pollutants remaining in the vessel.

47. The method of claim 46 wherein the step of capturing volatile organic compounds and other air pollutants further includes the step of treating the volatile organic compounds and other air pollutants to render the volatile organic compounds and other air pollutants harmless.

48. The method of claim 46 wherein the step of cooling and drying further includes an evacuation step.

49. The method of claim 46 wherein said processed products are transported for use as a fuel or fertilizer.

50. A method for treating diverse pulp and paper products derived from waste paper or MSW to produce a homogenous cellulosic feedstock comprising the steps of:

feeding diverse pulp and paper products into a vessel;

introducing steam into the vessel while agitating the products;

purging gases from the vessel while agitating the products;

capturing said gases and treating the gases to render any volatile organic compounds and any other air pollutants present in the gases harmless;

sealing the vessel so that the vessel is pressure tight;

saturating the products with steam at a temperature in the range of about 287° F. to about 312° F. and at a pressure in the range of about 40 psig to about 65 psig to expand the molecular structure of the products;

depressurizing the vessel to further enhance the molecular expansion of the products; and discharging the processed products therefrom.

51. The method of claim 50 wherein the pulp and paper products are derived from municipal solid waste.

52. The method of claim 50 wherein the method further includes the step of classifying cellulosic components of the processed products from other components.

53. The method of claim 52 wherein the step of classifying includes the step of separating the cellulosic components based on particle size.

54. The method of claim 52 wherein the step of classifying includes the step of separating the cellulosic components based on density.

55. The method of claim 52 wherein the step of classifying includes the step of separating the cellulosic components based on both particle size and density.

56. The method of claim 50 wherein the method further includes the steps of separating larger size components of the processed products and recycling the larger size components through the vessel for more processing.

57. The method of claim 50 wherein the method further includes the step of introducing the steam from the depressurized vessel into a second vessel containing diverse pulp and paper products for purging gases from the second vessel prior to full treatment of the products within the second vessel.

58. The method of claim 57 wherein the method further includes the steps of discharging processed products from each of a plurality of the vessels into a common conveyed stream, separating larger components from smaller components in the stream, and recycling the larger components through at least one of the vessels.

59. The method of claim 50 wherein the pulp and paper products have a moisture content of about 20% to about 60% by weight prior to the step of introducing steam.

60. The method of claim 50 wherein the temperature and pressure are maintained for a time sufficient for the products to be uniformly mixed and transformed into the homogenous cellulosic feedstock.

61. The method of claim 60 wherein the time is in the range of about 30 to about 60 minutes.

62. The method of claim 50 wherein the vessel includes a common opening serving as an inlet and outlet and the steps of feeding the diverse pulp and paper products into the vessel and discharging the diverse pulp and paper products from the vessel are both accomplished through the common opening.

63. The method of claim 62 wherein the vessel includes two or more internally mounted helical flights, the rotation of which agitates the pulp and paper products.

64. The method of claim 63 wherein the rotation of the helical flights in one direction causes the products to move away from the common opening.

65. The method of claim 63 wherein the rotation of the helical flights in a second direction causes the products to move toward the common opening.

66. The method of claim 63 wherein the vessel is capable of being tilted such that the common opening is positioned to not permit the products to fall out of the vessel.

67. The method of claim 63 wherein the vessel is capable of being tilted such that the common opening is positioned to permit the processed products to fall out of the vessel.

68. The method of claim 50 wherein the vessel includes a vent valve through which the gases are purged during the purging step.

69. The method of claim 50 wherein the step of depressurizing the vessel includes the step of recovering any steam remaining in the vessel.

70. The method of claim 69 wherein the step of recovering steam further includes the steps of condensing the steam and treating any condensable pollutants to render them harmless.

71. The method of claim 69 wherein the step of recovering the steam includes the step of recycling the steam.

72. The method of claim 50 wherein the step of depressurizing the vessel includes the step of cooling and drying the processed products, and recovering any volatile organic compounds or any other air pollutants remaining in the vessel.

73. The method of claim 72 wherein the step of cooling and drying further includes an evacuation step.

* * * * *